United States Patent [19]

Oshiga et al.

[11] Patent Number: 4,833,589
[45] Date of Patent: May 23, 1989

[54] PROGRAMMABLE SEQUENCE CONTROLLER

[75] Inventors: Takayuki Oshiga, Narashino; Katsuhiro Fujiwara, Funabashi; Toshiro Kasahara, Narashino; Hiromi Oshida, Chiba, all of Japan

[73] Assignee: Hitachi, Ltd., Tokyo, Japan

[21] Appl. No.: 895,845

[22] Filed: Aug. 12, 1986

[30] Foreign Application Priority Data

Aug. 30, 1985 [JP] Japan .................................. 60-189501

[51] Int. Cl.$^4$ ........................ G05B 19/00; G06F 15/00
[52] U.S. Cl. ..................................................... 364/140
[58] Field of Search ............................... 364/140–146

[56] References Cited

U.S. PATENT DOCUMENTS

| | | | |
|---|---|---|---|
| 4,162,536 | 7/1979 | Morley | 364/200 |
| 4,276,610 | 6/1981 | Fleck | 364/144 |
| 4,293,915 | 10/1981 | Carpenter et al. | 364/146 |
| 4,371,922 | 2/1983 | Fujita et al. | 364/146 |
| 4,404,625 | 9/1983 | Saito et al. | 364/144 |
| 4,413,319 | 11/1983 | Schultz et al. | 364/200 |
| 4,488,258 | 12/1984 | Struger et al. | 364/900 |
| 4,663,704 | 5/1987 | Jones et al. | 364/138 |

FOREIGN PATENT DOCUMENTS 8404977 12/1984 World Int. Prop. O. .

*Primary Examiner*—Allen MacDonald
*Attorney, Agent, or Firm*—Antonelli, Terry & Wands

[57] ABSTRACT

A programmable sequence controller has indicator lamps for displaying the status of the respective input and output signals. The indicator lamps are respectively coupled with signal input and output terminals through a connector, and are included as in a panel which cover the front surface of the signal input and output terminals.

6 Claims, 6 Drawing Sheets

FIG. 3
FIG. 6
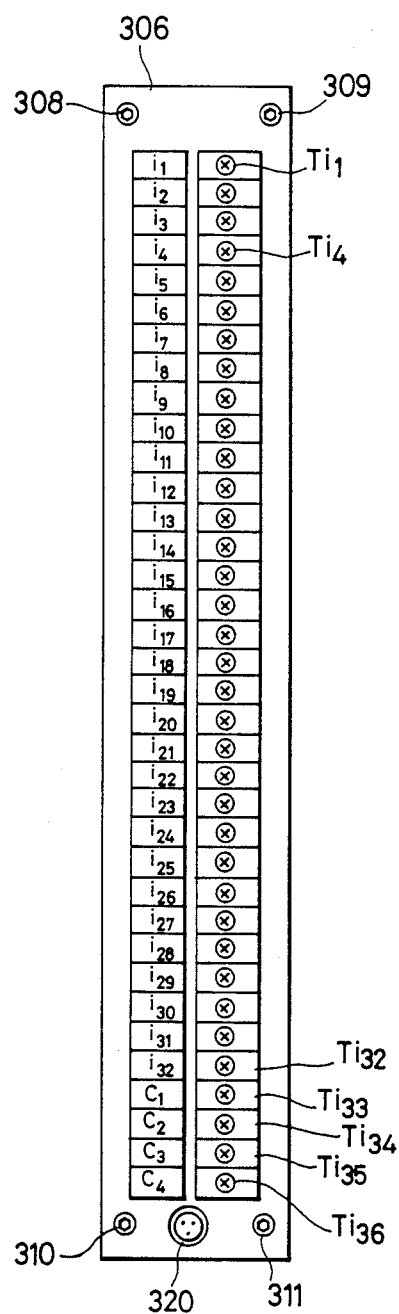
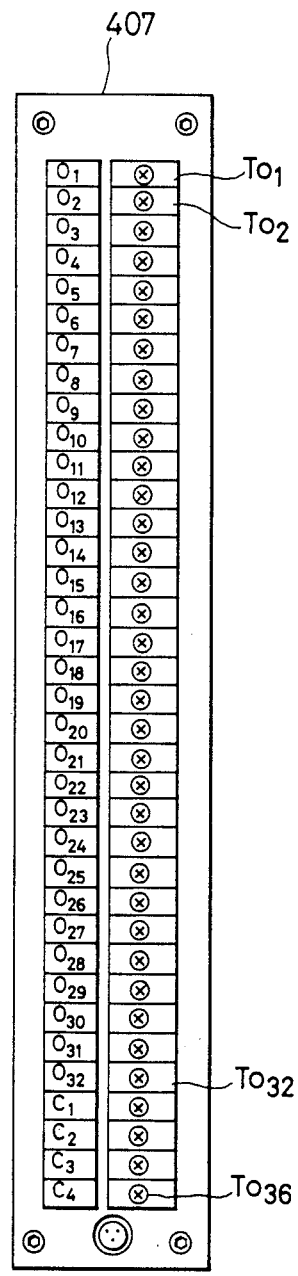

FIG. 7
FIG. 8
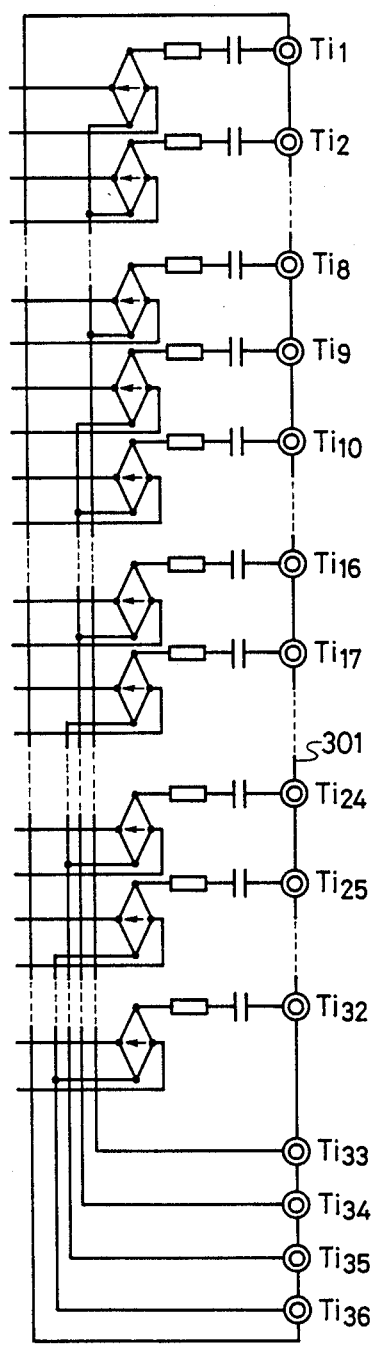
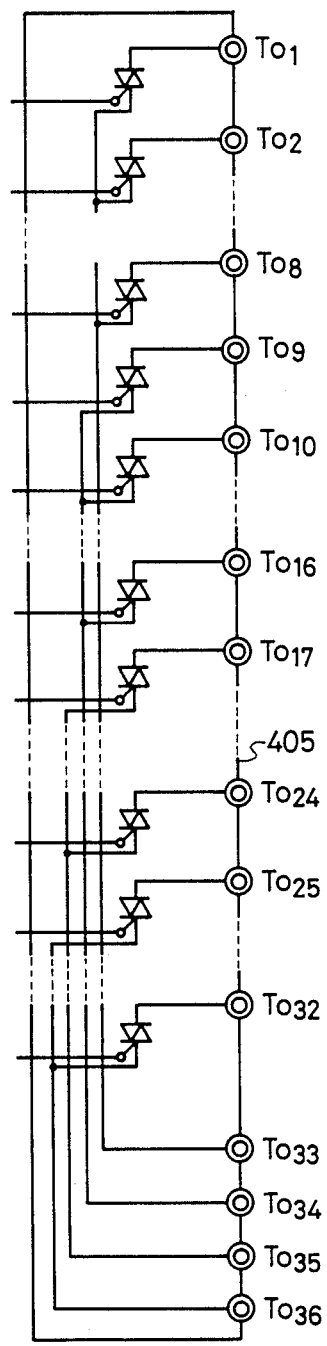

PROGRAMMABLE SEQUENCE CONTROLLER

BACKGROUND OF THE INVENTION

The present invention relates to a programmable sequence controller (hereinbelow, simply termed 'PSC') which functions to display the input/output statuses of signals.

There have been often used PSCs furnished with the display function for displaying the input/output statuses of signals in order to do an error check of a user program or to inquire into the cause of a malfunction. The PSCs have heretofore been proposed in, for example, Japanese patent applications laid-open No. 58-132809, No. 58-94011 and No. 58-78207.

Many of the hitherto-proposed PSCs with the display function have indicator lamp units mounted on the casings of the so-called input/output modules having signal input terminals and signal output terminals. It is therefore impossible to comply with a request for fulfilling the display function at a position remote from the input-/output modules.

The number of indicator lamps to be prepared is equal to the number of signal input and output nodes on many occasions. In general, the number of the input-/output nodes of a single input/output module is $8 \times n$ (n being a positive integer), and hence, the number of the indicator lamps becomes considerably large. Accordingly, where the indicator lamps are installed poses a problem.

It is dangerous for people to come into contact with input/output terminals. Therefore, insulating covers for concealing the terminals are required.

SUMMARY OF THE INVENTION

The present invention overcome such drawbacks, and has for its principal object to provide a PSC which can fulfill the display function at a position remote from input/output modules.

Another object of the present invention is to provide a PSC in which the front dimensions of a portion where the terminals of an input/output module are arrayed can be made smaller than in the prior arts.

Other objects and attendant effects of the present invention will be readily understood from the ensuing description.

According to the present invention, in a PSC having a plurality of signal input/output terminals shown as a parallel I/O bus in FIG. 1, a RAM $2b$ for storing a user program, a ROM $2c$ for storing a system program, a logic processor $2a$ which logically processes the inputs of the signal input terminals $Ti_1-Ti_{33}$ as variables on the basis of the user program stored in the user program storing RAM under the control of the system program stored in the system program storing ROM and which supplies the signal output terminals $T_{O1}-T_{O33}$ with signals corresponding to the processed result, and a plurality of indicator lamps which display the statuses of the input/output signals of the signal input terminals and the signal output terminals; the indicator lamps and the signal input/output terminals are connected through a serial transmission line 350 or 450.

A parallel-to-serial converter 305 or 406 for converting the parallel signals of the signal input/output terminals into serial signals is interposed between the serial transmission line and the terminals, while a serial-to-parallel converter for converting the serial signals into parallel signals is interposed between the serial transmission line and the indicator lamps.

As stated before, the number of the input/output nodes of one input/output module is considerably large. Accordingly, when the logic processor and the indicator lamps are connected through parallel transmission lines, the number of leads becomes considerably large. Especially when the input/output module and the transmission lines are connected by the use of the connectors, the dimensions of the connectors must be made as small as possible. In this regard, it becomes very advantageous to employ the serial transmission line.

The indicator lamps and the serial-to-parallel converter are constructed as an integral unit, and the unit is attached to a casing having the signal input terminals or signal output terminals, by attaching/detaching means aligned with and covering the signal input/output terminals. And as a result, the front dimensions of a portion where the terminals of the input/output module are arrayed can be made smaller than in the prior arts.

Moreover, since the front surface of the signal input-/output terminals is covered with the unit, there is no fear of anyone accidentally being in contact with the signal input/output terminals even when there is no insulating cover disposed.

BRIEF DESCRIPTION OF THE DRAWINGS

The drawings illustrate embodiments of a programmable sequence controller according to the present invention, in which:

FIG. 3 is a front view showing an input module from which panel bearing indicator lamps have been removed;

FIG. 6 is a front view showing an output module from which panel bearing indicator lamps has been removed;

FIGS. 7 and 8 are more detailed circuits of the block 301 and block 405, respectively, shown in FIG. 1.

DESCRIPTION OF THE PREFERRED EMBODIMENTS

Figure 1:
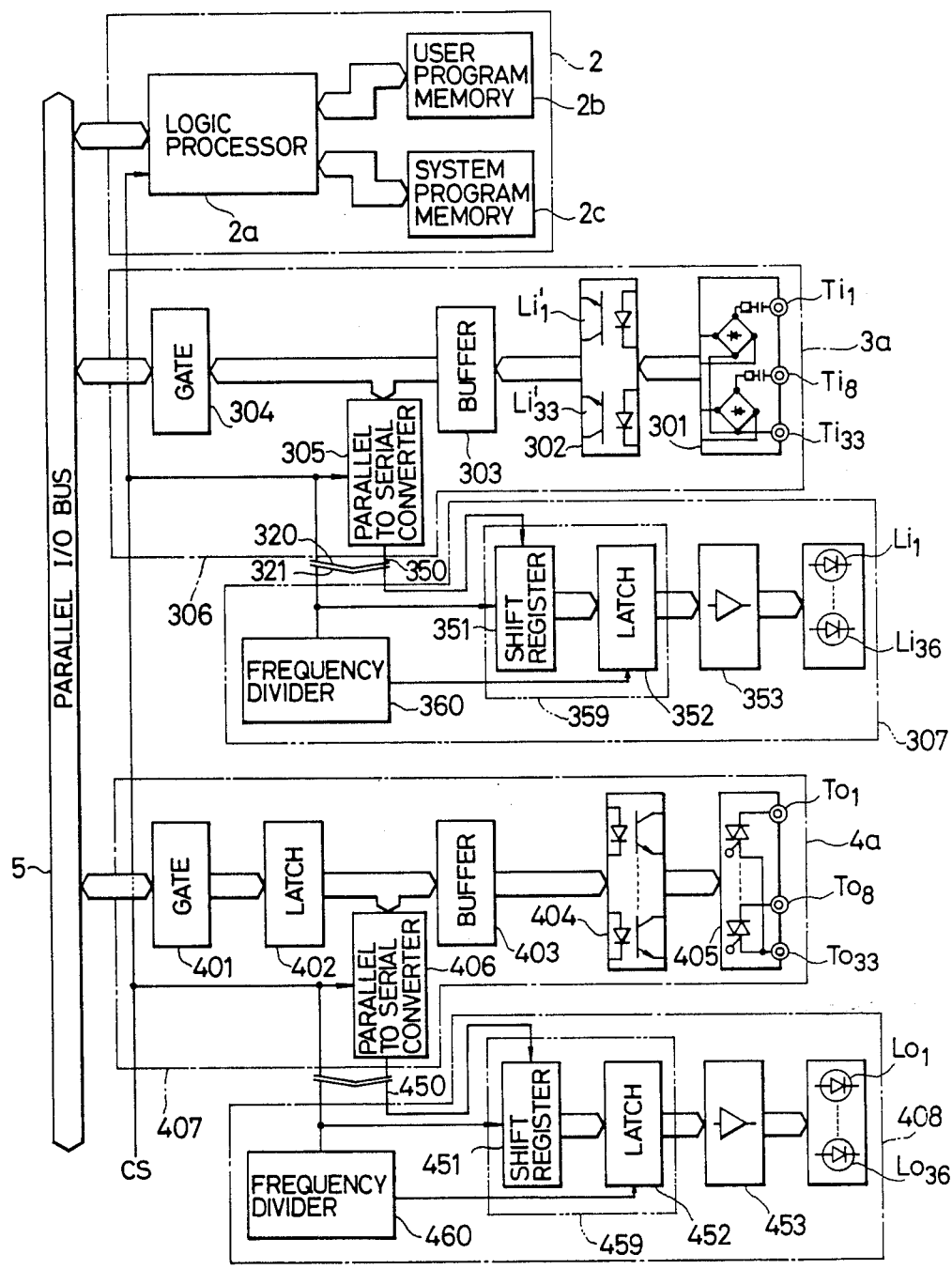
FIG. 1 is a block diagram of the PSC.

Now, embodiments of the present invention illustrated in the drawings will be described.

Figure 2:
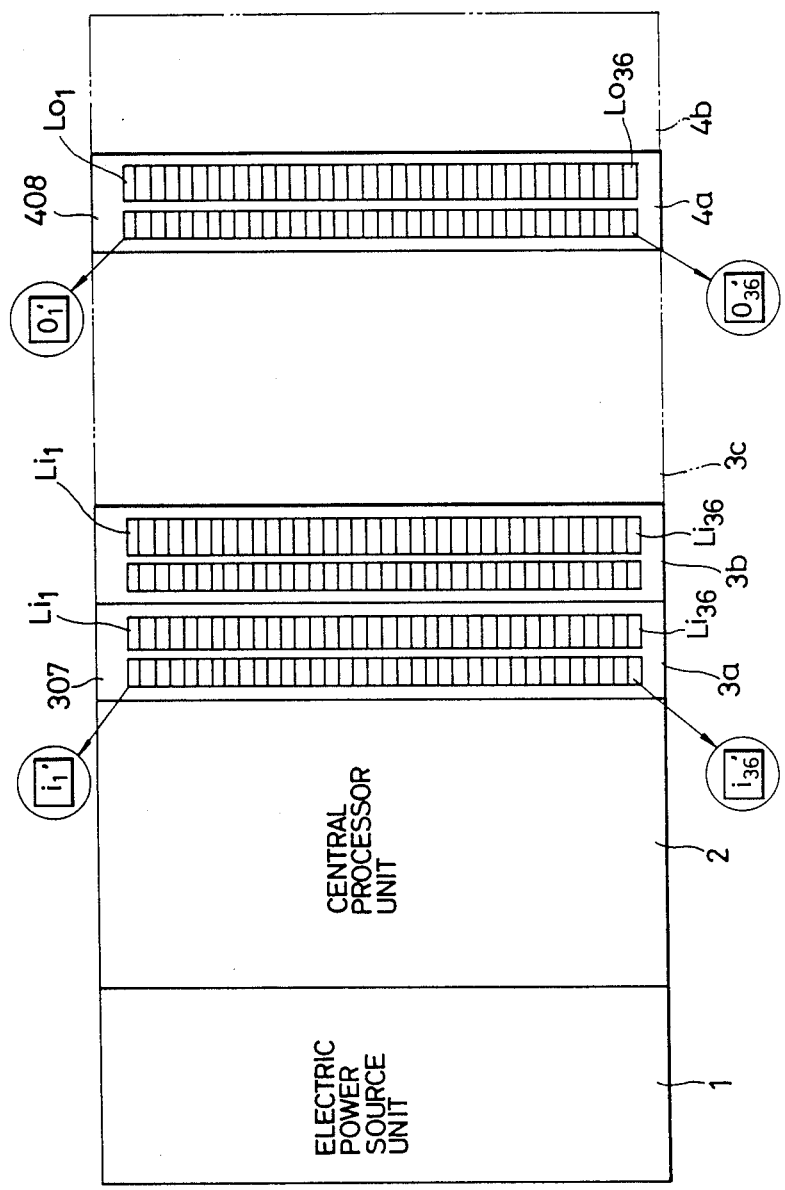
FIG. 2 is a front view thereof.

FIG. 2 is a general view showing one aspect of a module type PSC. This controller consists of an electric power source unit 1, a central processor unit 2, input module $3a$, $3b$ ..., and output modules $4a$, $4b$ .... The electric power source unit 1 receives commercial electric power, and rectifies it or converts it into voltage levels required by the central processor unit 2 and the input/output modules $3a$, $3b$ .../$4a$, $4b$ .... Also, during the service interruption of a commercial electric power source, it supplies backup electric power for holding a user program written in a RAM $2b$. The central processor unit 2 and the input/output modules $3a$, $3b$ .../$4a$, $4b$ ... are parallel connected to parallel I/O bus 5. The FIG. 1 shows block diagram only one input module and one output module, namely, the modules $3a$ and $4a$ connected to the parallel I/O bus 5, and the other modules $3b$, $3c$ ... and $4b$, $4c$ ... are omitted from the illustration.

The central processor unit 2 has a logic processor $2a$, the user program storing RAM $2b$, and a ROM $2c$ for storing a system program.

The sequence program written by a user is written in the user program storing RAM $2b$, while the system program necessary for operating the controller in accordance with the sequence program is written in the system program storing ROM $2c$.

On the basis of the user program, the logic processor $2a$ executes a logic operation using as variables the inputs of signal input terminals $Ti_1, Ti_2, \ldots Ti_{32}$ or the outputs of signal output terminals $To_1, To_2, \ldots To_{32}$ on some occasions and delivers signals based on the result of the logic operation, to the predetermined signal output terminals $To_1, To_2, \ldots To_{32}$.

FIG. 3 is an exterior view of one of the input modules $3a, 3b \ldots$. Each input module has terminals $Ti_1$-$Ti_{36}$ numbering thirty-six in total, to which terminal symbols $i_1, i_2, \ldots i_{32}$ and $c_1$-$c_4$ respectively positionally correspond to. Among them, the terminal $Ti_{33}$ functions as the common terminal of the input terminals $Ti_1$-$Ti_8$. Likewise, the terminal $Ti_{34}$ functions as the common terminal of the input terminals $Ti_9$-$Ti_{16}$, the terminal $Ti_{35}$ as the common terminal of the input terminals $Ti_{17}$-$Ti_{24}$, and the terminal $Ti_{36}$ as the common terminal of the input terminals $Ti_{25}$-$Ti_{32}$.

As only parts are illustrated in FIG. 1 and more details are shown in FIG. 7, rectifier circuits are connected between the respective terminals $Ti_1$-$Ti_{32}$ and the common terminals $Ti_{33}$-$Ti_{36}$ as shown in a block 301, and photo-isolators $Li'_1, Li'_{33}$ are connected on the output sides of the rectifier circuits as shown in a block 302. The photo-isolators serve to electrically isolate the input terminals $i_1$-$i_{32}$ and common terminals $i_{33}$-$i_{36}$ from the parallel I/O bus 5 and to transmit signals.

The outputs of the respective photo-isolators are converted by a buffer circuit 303 into TTL signals, which are input to the logic processor $2a$ through a gate 304 and the parallel I/O bus 5.

Figure 4:
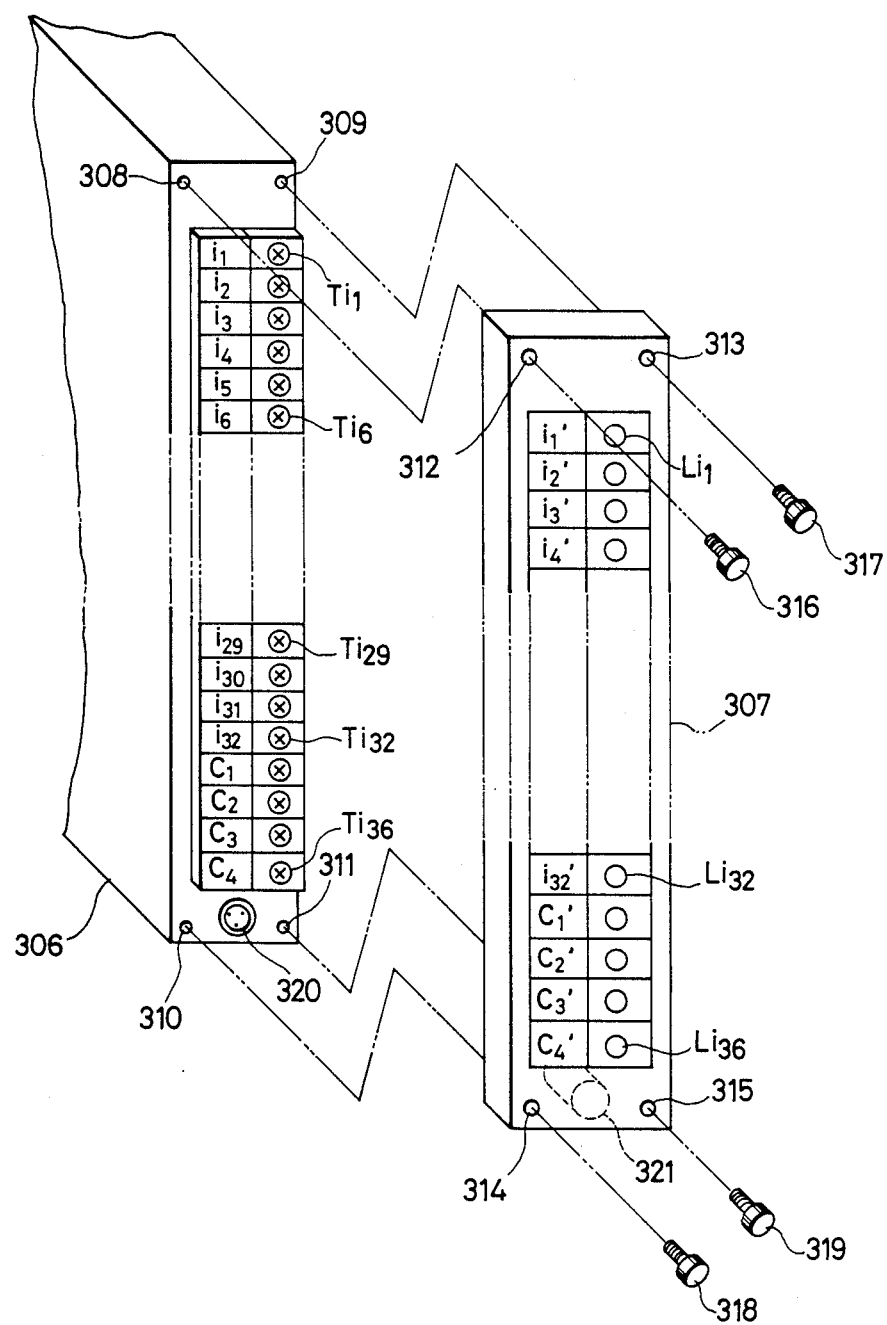
FIG. 4 is a perspective view showing an attaching configuration for a casing and the panel.

As shown in FIG. 4, each of the input modules $3a, 3b \ldots$ has indicator lamps $Li_1$-$Li_{36}$ which are equal in number to the input terminals $Ti_1$-$Ti_{32}$ and common terminals $Ti_{33}$-$Ti_{36}$. Although the indicator lamps $Li_{33}$-$Li_{36}$ corresponding to the common terminals $Ti_{33}$-$Ti_{36}$ can be omitted, they are sometimes convenient because the statuses of signals entering the common terminals can be observed. As shown in FIG. 4, terminal symbols $i_1'$-$i_{32}'$ and $c_1'$-$c_4'$ are similarly indicated beside the indicator lamps. In each of the input modules $3a, 3b \ldots$ a panel 307 on which the indicator lamps $Li_1$-$Li_{36}$ are mounted is constructed as a unit separate from a casing 306 which includes an assembly of the rectifier circuit block 301, the block 302 served to transmit signals by the photo-isolator as mentioned before, the buffer circuit 303, the gate 304, and a shift register as a parallel-to-serial converter 305. The panel 307 is fixedly attached to cover the front surface of the input terminals $Ti_1$-$Ti_{36}$ or detached by an attaching/detaching means.

FIG. 4 shows one aspect of the attaching/detaching means. In the embodiment illustrated here, the attaching/detaching means is constructed of threaded holes 308–311 which are located in the four corners of the face of the casing 306, through holes 312–315 which are provided in the panel 307 and aligned with the threaded holes, and screws 316–319 which are threadably inserted into the threaded holes 308–311 through the through holes 312–315.

Figure 5:
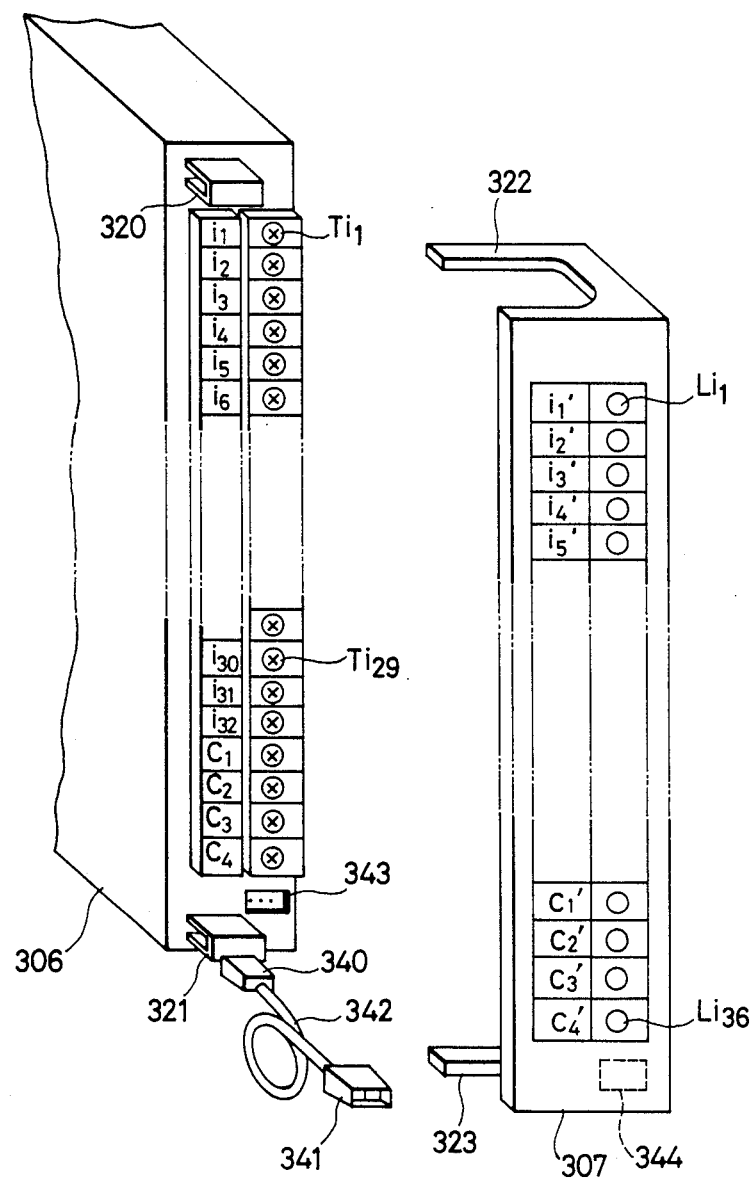
FIG. 5 is a perspective view showing another attaching configuration for the casing and the panel.

FIG. 5 shows another example of the attaching/detaching means. In this example, channels 320 and 321 extending horizontally are fastened on the upper and lower parts of the face of the casing 306. Each of the channels 320 and 321 is disposed in such a manner that both sides of its open parts are fixed to the face of the casing 306.

On the other hand, the panel 307 is provided with tongues 322 and 323 which are inserted into the respective channels 320 and 321 sidewards.

FIG. 6 is an exterior view of one of the output modules $4a, 4b \ldots$ with a panel separated therefrom. As in the input module, each output module has terminals $To_1$-$To_{36}$ numbering thirty-six in total, to which terminal symbols $o_1$-$o_{32}$ and $co_1$-$co_4$ are affixed alongside and which respectively correspond to. Among them, the terminal $To_{33}$ functions as the common terminal of the output terminals $To_1$-$To_8$. Likewise, the terminal $To_{34}$ functions as the common terminal of the output terminals $To_9$-$To_{16}$, the terminal $To_{35}$ as the common terminal of the output terminals $To_{17}$-$To_{24}$, and the terminal $To_{36}$ as the common terminal of the output terminals $To_{25}$-$To_{32}$. Since only parts in schematic block form are illustrated in FIG. 1 and more details are shown in FIG. 8, signals are delivered from the logic processor $2a$ to the resepctive output terminals $To_1$--$To_{32}$ and common terminals $To_{33}$-$To_{36}$ through the parallel I/O bus 5, a gate 401, a latch circuit 402, a buffer circuit 403, an isolation circuit 404 and an output circuit 405. Thirty-two photo-isolators are disposed in the isolation circuit 404, and their outputs are used to control the respective gates of corresponding Triacs of the output block 405, whereby the output signals are delivered to the respective output terminals $To_1$-$To_2$.

As shown in FIG. 2, each of the output modules $4a, 4b \ldots$ also has indicator lamps $Lo_1$-$Lo_{36}$ which are equal in number to the output terminals $To_1$-$To_{32}$ and common terminals $To_{33}$-$To_{36}$. Although the indicator lamps $Lo_{33}$-$Lo_{36}$ corresponding to the common terminals $To_{33}$-$To_{36}$, can be omitted, they are sometimes convenient because the statuses of the signals of the common terminals can also be observed.

In each of the output modules $4a, 4b \ldots$, the panel 408 on which the indicator lamps $Lo_1$-$Lo_{36}$ are mounted is constructed as a unit separate from a casing 407 which includes an assembly of the gate 401, the latch circuit 402, the buffer circuit 403, the isolation circuit 404, the output circuit 405, and a shift register as a parallel-to-serial converter 406. The panel 408 is attached by attaching/detaching means so as to cover the front surface of the output modules terminals $To_1$-$To_{36}$.

Since the attaching/detaching means is similar in construction as with respect to the input modules $3a, 3b \ldots$, its description is not necessary.

As understood from the embodiment, the number of input nodes of each of the input modules $3a, 3b \ldots$ or the number of output nodes of each of the output modules $4a, 4b \ldots$ can be at least thirty-two. In recent years, the number of such nodes has been increasing.

In a preferred embodiment of the present invention, therefore, the casing 306 and the panel 307 and also the casing 407 and the panel 408 are respectively connected through serial transmission lines 350 and 450. As a result, the outputs of the buffer circuit 303 which are parallel signals are converted into serial signals by the parallel-to-serial converter 305, the serial signals received by the panel 307 are converted into parallel signals by a serial-to-parallel converter 359 which is disposed on the panel 307 and which is constructed of a shifter register 351 and a latch circuit 352, and these parallel signals are applied to the indicator lamps $Li_1$–$Li_{36}$ through a buffer circuit 353.

In addition, the parallel signals produced by the latch circuit 402 are converted into serial signals by the parallel-to-serial converter 406, the serial signals received by the panel 408 are converted into parallel signals by a serial-to-parallel converter 459 which is disposed on the panel 408 and which is constructed of a shift register 451 and a latch circuit 452, and these parallel signals are applied to the indicator lamps $Lo_1$–$Lo_{36}$ through a buffer circuit 453.

The logic processor 2a, the shift registers 351, 451 and the parallel-to-serial converters 305, 406 are synchronously operated by receiving a common clock signal Cs. The latch circuits 352 and 452 are respectively controlled by the outputs of frequency dividers 360 and 460 disposed on the panels 307 and 408. The frequency dividers 360 and 460 produce the output signals synchronized with the clock signal Cs.

Owing to the above arrangement, the casing 306 and the panel 307 and also the casing 407 and the panel 408 can be connected by the serial transmission lines 350, 450 and requiring a small number of signal lines for transmitting the clock signal Cs. Moreover, the same number of signal lines suffice for transmitting signals even when the numbers of input/output nodes of the input/output modules increase.

With the embodiment shown in FIGS. 3 and 4, the jack 320 of a connector is disposed on the front surface of the casing 306, while the plug 321 of the connector is disposed on the rear surface of the panel 307 and positionally aligned with the jack. When the screws 316–319 are tightened, the jack 320 and the plug 321 are connected, and the outputs of the parallel to serial converter 305 and the clock signal Cs are transmitted from the casing 306 to the panel 307. In the state in which the panel 307 is attached by the attaching/detaching means, the front surface of the input/output terminals is covered with this panel 307. Besides, the indicator lamps for displaying the input/output statuses of the respective input/output terminals lie in front of the corresponding input/output terminals.

Further, with respect to the embodiment shown in FIG. 5, there is included a flexible cable 342 having a plug 340 at one end and a jack 341 at the other end. The plug 340 is inserted into a jack 343 disposed on the front surface of the case, and the jack 341 is fitted on a plug 344 disposed on the rear surface of the panel 307, whereby the outputs of the parallel-to-serial converter 305 are transmitted to the shift register 351, and the clock signal Cs is transmitted to the frequency divider 360 and the shift register 351.

According to such an embodiment, therefore, the indicator lamps can be readily disposed in a control board or on a console which is installed at a position distant from the casing 306 (or 407).

What is claimed is:

1. In a programmable sequence controller including a plurality of input modules each having a plurality of input signal terminals; a plurality of output modules each having a plurality of output signal terminals; user program storage means for storing a user program; system program storage means for storing a system program; logic processing means for executing a logic operation in response to input signals received from said signal input terminals in accordance with a user program stored in said user program storage means under the control of a system program stored in said system program storage means and providing at said signal output terminals the result of said logic operation executed by said logic processing means; and a plurality of indicator lamps which display the status of each signal at said input and output terminals; said programmable sequence controller further comprising:

a plurality of transmission lines, each transmission line being included for a corresponding one of said plurality of input and output modules so that said indicator lamps are coupled via a respective transmission line to at least one of the plurality of said input and output terminals;

plurality of parallel-to-serial conversion means, each conversion means being included in a corresponding one of said plurality of input and output modules and being coupled between a respective transmission line and at least one of the plurality of said input and output terminals, so as to convert at least incoming parallel signals from the plurality of input terminals into serial signals;

plurality of gate means, a respective one being included in each one of said plurality of input and output modules for respectively coupling said plurality of input and output terminals to said logic processing means; and plurality of serial-to-parallel conversion means, each conversion means being included in a corresponding one of said plurality of input and output modules having a parallel-to-serial conversion means, so as to re-convert parallel-to-serial converted signals into parallel signals, each of said plurality of serial-to-parallel conversion means being coupled between a respective transmission line and said indicator lamps.

2. A programmable sequence controller according to in claim 1, wherein each of said input and output modules comprise:

an integral unit including both said indicator lamps and a respective one of said plurality of serial-to-parallel conversion means;

a casing, said integral unit being attached by attaching/detaching means to said casing where said plurality of input or output terminals are fixedly positioned; and said integral unit being shaped such that it is aligned with and covering a front surface of said input or output terminals when attached by said attaching-/detaching means to said casing.

3. A programmable sequence controller according to claim 2, wherein said indicator lamps comprise a plurality of lamps equal in number to that of said signal input terminals and said signal output terminals, and said indicator lamps which display the signal input statuses and signal output statuses of the respective signal input terminals and output terminals are disposed in said integral units so that they are located in front of the corresponding terminals when attached to corresponding casings.

4. In a module of a programmable sequence controller having at least one of a plurality of signal input terminals and a plurality of signal output terminals; and a plurality of indicator lamps which display at least one of the input and output signal statuses of the signal input terminals and signal output terminals; wherein said programmable sequence controller, consisting of at least one input and output module, further comprising:

a casing having fixedly positioned thereat said plurality of signal input or output terminals being coupled via a transmission line to said plurality of indicator lamps;

parallel-to-serial conversion means for converting parallel signals delivered from said plurality of signal input and output terminals into serial signals, being coupled between said transmission line and said plurality of input and output terminal; and serial-to-parallel conversion means, for re-converting parallel-to-serial converted signals into parallel signals, being coupled between said transmission line and said indicator lamps.

5. A module of a programmable sequence controller according to claim 4, further comprising;

an integral unit including both said indicator lamps and said serial-to-parallel conversion means; and wherein said transmission line is a flexible transmission ling, wherein a distance of between said signal input and output terminals and said indicator lamps may change.

6. A module of a programmable sequence controller according to claim 4, further comprising;

an integral unit including both said indicator lamps and said serial-to-parallel conversion means;

a casing, said integral unit being attachable to said casing by attaching/detaching means; and said integral unit being shaped such that it is aligned with and covering a front surface of said input or output terminals when attached by said attaching-/detaching means to said casing.

* * * * *